United States Patent [19]

Reddy et al.

[11] Patent Number: 5,904,949
[45] Date of Patent: *May 18, 1999

[54] WATER-IN-OIL EMULSION SPREAD

[75] Inventors: Podutoori Ravinder Reddy, Columbia, Md.; Peter Trzasko, Plainsboro, N.J.; James Kasica, Whitehouse Station, N.J.; Judith Jackson, Somerville, N.J.

[73] Assignee: Van den Bergh Foods Company, Division of Conopco, Inc., Lisle, Ill.

[*] Notice: This patent issued on a continued prosecution application filed under 37 CFR 1.53(d), and is subject to the twenty year patent term provisions of 35 U.S.C. 154(a)(2).

[21] Appl. No.: 08/644,545

[22] Filed: May 10, 1996

[51] Int. Cl.$^6$ ....................................................... A23D 7/00
[52] U.S. Cl. ............................................ 426/603; 426/578
[58] Field of Search ...................... 426/601, 602, 426/603, 573, 578

[56] References Cited

U.S. PATENT DOCUMENTS

| | | |
|---|---|---|
| H1394 | 1/1995 | Dreese ....................................... 426/603 |
| 3,674,555 | 7/1972 | Meyer et al. . |
| 4,103,037 | 7/1978 | Bodor et al. . |
| 4,280,851 | 7/1981 | Pitchon et al. . |
| 4,465,702 | 8/1984 | Eastman et al. . |
| 4,536,408 | 8/1985 | Morehouse et al. . |
| 4,865,867 | 9/1989 | Platt et al. . |
| 4,869,919 | 9/1989 | Lowery ....................................... 426/603 |
| 4,917,915 | 4/1990 | Cain et al. . |
| 4,978,554 | 12/1990 | Larsson et al. . |
| 5,037,929 | 8/1991 | Rajagopalan et al. . |
| 5,131,953 | 7/1992 | Kasica et al. . |
| 5,149,799 | 9/1992 | Rubens . |
| 5,187,272 | 2/1993 | Katcher et al. . |
| 5,279,844 | 1/1994 | Wesdorp et al. . |
| 5,302,408 | 4/1994 | Cain et al. . |
| 5,338,560 | 8/1994 | Wesdorp et al. . |
| 5,346,716 | 9/1994 | Bakal ........................................ 426/603 |
| 5,374,445 | 12/1994 | Havenstein .............................. 426/603 |
| 5,472,729 | 12/1995 | Larsson . |
| 5,501,869 | 3/1996 | Buliga ....................................... 426/603 |
| 5,656,322 | 8/1997 | Livingston ............................... 426/603 |
| 5,676,994 | 10/1997 | Eskins ...................................... 426/602 |

FOREIGN PATENT DOCUMENTS

WO 95/04082  2/1995  WIPO .

OTHER PUBLICATIONS

American Heritage Dictionary 1976 Houghton Mifflin Co p. 832.

Fette Seifen Antrichmittel, 1978, pp. 180–186, No. 5 "A Method for the Determination of the Solid Phase Content of Fats Using Pulse Nuclear Magnetic Resonance".

Handbook of Water–Soluble GUms and Resins, Robert L. Davison, McGraw Hill, Inc., NY 1980, pp. 22–26 "Starch and its Modifications".

Chapter XXII "Production And Use of Pregelatinized Starch", Starch Chemistry & Technology, vol. III Industrial Aspects Whistler et al., Academic Press, NY, 1967, pp. 523–536.

J. Colloid & Interface Science, vol. 140, No. 1, Nov. 1990, pp. 105–113.

*Primary Examiner*—Carolyn Paden
*Attorney, Agent, or Firm*—Matthew Boxer

[57] ABSTRACT

A fat continuous spread is described having up to about 65 wt % fat and a dispersed aqueous phase which contains an amylose containing gelling starch characterized by a $G'_{eq}$ of 400 dyne/cm$^2$ or greater and a critical strain value ($\gamma cr$) of 12 or greater at 10° C. provided the starch is prepared at a concentration having an anhydrous starch solid content of 10 wt %.

8 Claims, 2 Drawing Sheets

WATER-IN-OIL EMULSION SPREAD

FIELD OF THE INVENTION

The present invention is concerned with a spread containing from about 10 to about 65 wt. % of a continuous fat phase and from about 90 to about 35 wt. % of a dispersed aqueous phase based on an amylose containing gelling starch having specific rheological properties.

BACKGROUND OF THE INVENTION

A wide variety of water-in-oil spreads having a fat content of below 80 wt. % have been used as replacements for butter or margarine. These fat continuous spreads should have a plastified continuous fat phase to give them suitable spreadability and to prevent microbiological deterioration. Moreover, the spreads should not release moisture when spread on a food item and should be spreadable at refrigerator temperature, be stable at room temperature yet destabilize and release their flavor in the mouth. These goals are difficult to achieve particularly when only a relatively small amount of fat is to be used to constitute the continuous phase.

Fat continuous products wherein the aqueous phase contains a gelling agent and is gel forming are described in U.S. Pat No. 4,917,915 (Cain et al). The gelling agents are selected from a gelling hydrolyzed starch derivative, gelatin, carrageenan and mixtures thereof. The hydrolyzed starch is generally defined as a gelling maltodextrin. Non-gelling starches are also described as present in the aqueous phase as bulking agents or viscosity enhancers.

Bodor et al. (U.S. Pat. No. 4,103,037) describes fat continuous products which also contain gelling agents, such as gelatin and Danish agar, in the aqueous phase. Bodor teaches that the type of gelling agent used in low fat continuous spread is critical since most gelling agents that can assist in the stabilization of the emulsions have too high a melting point and give a gluey unpleasant impression when chewed.

U.S. Pat. No. 4,978,554 (Larsson et al.) describes a low fat spread having an emulsion such that the final product can be pasteurized. Storage stability of the product is obtained by combining starch with a small amount of an emulsifier which is capable of preventing gel formation by forming a starch/emulsifier complex.

U.S. Pat. No. 5,472,729 (Larsson) discloses a method for producing a low fat spread whereby starches selected are acid hydrolyzed, and if necessary further stabilized from gelling by further reactions of starch with reagents capable of adding functional groups to the starch molecule. The stabilization imparted by these functional groups makes it possible to obtain such stabilization that the starch does not gel after solubilization. Thus the need for the use of emulsifiers as described in U.S. Pat. No. 4,978,554 is strongly reduced. Starches described in U.S. Pat. No. 5,472,729 exhibit a heavy viscosity peak upon gelatinization after which the solution becomes thinner. Upon cooling, the starch in the solution does not gel and, in fact, the viscosity remains at a low level.

U.S. Pat. No. 4,536,408 (issued Aug. 20, 1985 to Moorehouse et at.) discloses low fat spreads comprising a blend of an edible fat and a non-gelled starch hydrolyzate having a D.E. of about 4 and not more than 25.

U.S. Pat. No. 5,279,844 and U.S. Pat. No. 5,338,560 (Wesdorp) disclose edible plastic dispersions not having a continuous fat phase and having at least one continuous water phase. A gelling starch is used in the spread which has a rheological property in aqueous dispersion characterized by a one-half $G'_{max}$ value at no more than about 9,600 seconds when prepared at a concentration to yield a $logG'_{max}$ value of 5.0 at 11° C., 15,000 seconds after the gelling starch is completely dispersed in the aqueous dispersion. The G' values reflect the rate and extent of structure formation. Critical strain values were not a performance criteria for the described starches.

U.S. Pat. No. 4,865,867 (Plaft et al.) discloses a low fat spread, having continuous fat phase and a dispersed aqueous phase comprising proteins derived from milk and from 0.1 to 1.2% by weight of a modified starch. Examples of described starches include white or yellow dextrins and roasted or dextrinized starch. These starches fall within the class of materials known as "starch hydrolysis products" which are typically low in viscosity and have a measurable D.E. value. Additional starch products cited as useful include acetylated distarch adipate, acetylated distarch phosphates and hydroxypropl distarch phosphates. These latter three classes of starch derivatives are known in the industry as viscosifying starches and are typically non-gelling. The proteins and starch present in the aqueous phase increase in the viscosity of the aqueous phase which in turn is believed to be responsible for an increase in stability of these water-in-oil emulsion products.

It has now been discovered that a gelling starch based on amylose and having specific Theological properties may be used to formulate fat continuous spread which exhibits good spreadability, good stability without watering out and yet releases its flavor in the mouth for good organoleptic properties.

SUMMARY OF THE INVENTION

Accordingly, the present invention provides a fat continuous spread containing less than about 65 wt % fat, comprising from about 10 to about 65 wt. % of a continuous fat phase and from about 90 to about 35 wt. % of a dispersed aqueous phase. The aqueous phase has from about 1 to about 20 wt. % of an amylose containing gelling starch which has a rheology in an aqueous dispersion characterized by a G' value at about 400 dyne/cm² or greater and a critical strain value (γcr) of 12 or greater when measured at 10° C., provided that the starch is prepared having an anhydrous starch solid content of 10 wt. %.

The present spreads are suitably prepared with conventional heat exchangers such as Votator$^{(R)}$ A-units and stirred C-units provided with a cooling jacket. Preferably the starch is gelatinized to prepare the aqueous phase which is then combined with the fat phase and processed such that its resulting product is fat continuous.

Figure 1:
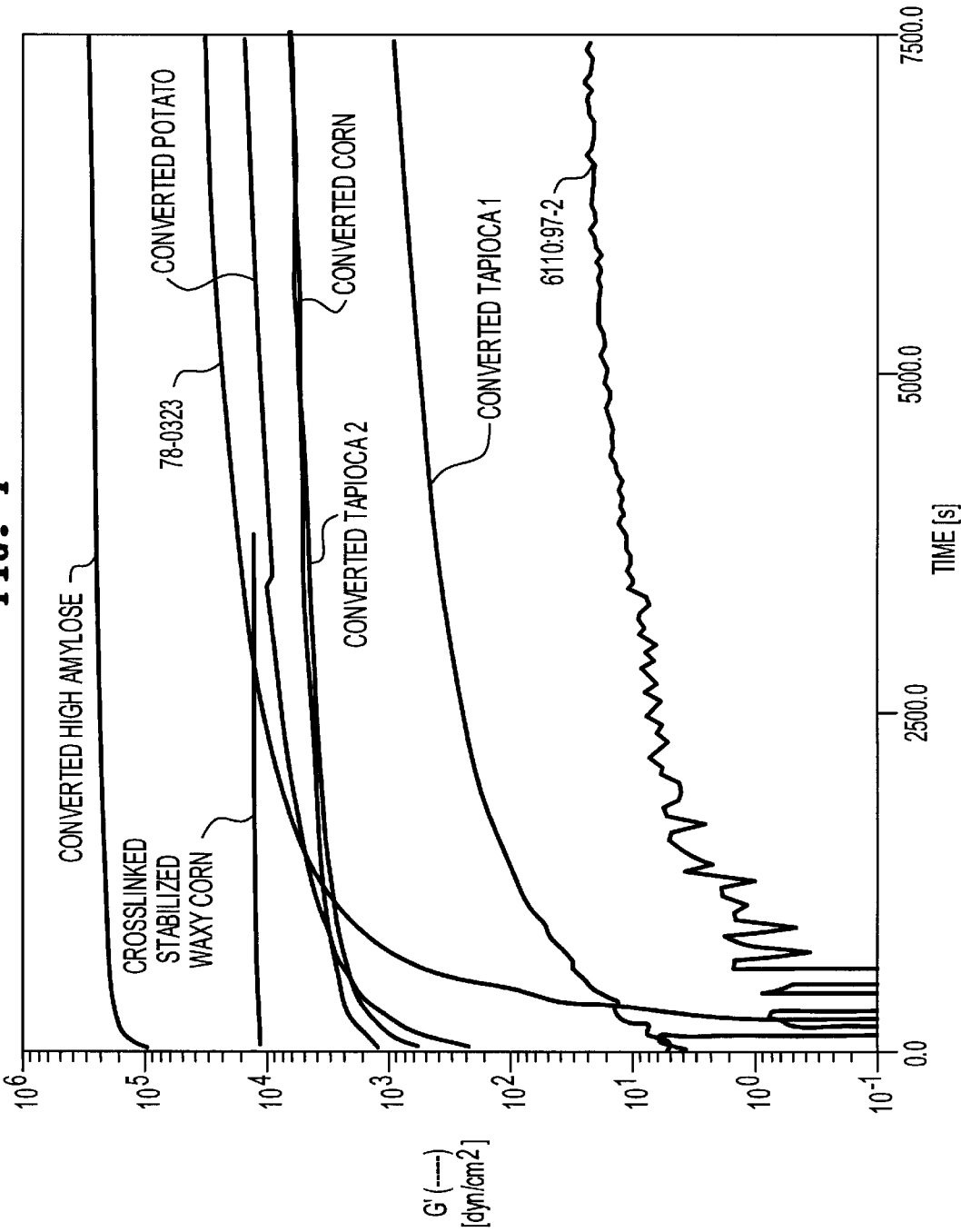
FIG. 1 graphically illustrates the gelling characteristics of amylose containing gelling starches according to the invention compared to gelling starches outside the invention. In this figure, G'[dyne/cm²] values of aqueous starch dispersions at concentrations of 10 wt. % anhydrous starch solid content are plotted against time elapsed in seconds following the dispersion of the starch in water. Test methods illustrated in this graph are set forth in the testing methods described below.

which indicate the ease with which the starch gels are disrupted. Test methods used to generate this graph are described below.

DETAILED DESCRIPTION OF PREFERRED EMBODIMENTS

The term "aqueous starch dispersion" shall mean an aqueous solution of gelatinized starch or a colloidal dispersion of starch and water.

The product according to the invention has a fat continuous phase and a dispersed aqueous phase. The term "continuous fat phase" is meant to include the oil present in the liquid state and forming a continuous phase as well as the solid fat particles contained in the liquid fat, the liquid oil that has been phased separated from the liquid oil by crystallization of fat by the classification treatment. The term "continuous fat phase" does not, however, include any fat contained in the dispersed aqueous phase as occurs in a product having a so called oil-in-water structure.

Gelling Amylose Containing Starch

The starches suitable for use herein are characterized by specific rheological properties and gel during manufacture of the spread dispersion and during storage at ambient or below ambient temperatures. Particularly preferred starches further lack starch flavor from the starch source and/or the starch modification and provide a spread with good texture and mouth feel.

G' is the elastic modulus of a gel measured in dyne/cm$^2$. To measure G' values, a selected starch or starch blend having a 10 wt. % anhydrous starch solid concentration is completely dispersed in water. The dispersed starch is then placed on a rheometer plate at 10° C. and an oscillatory shear time sweep is performed with the equilibrium value ($G'_{eq}$) being obtained. A detailed description of the starch rheology test used in this invention is described in the testing methods section below.

A critical strain value (γcr) of each starch dispersion was determined to measure the size of deformation required to disrupt the gel after equilibrium was reached at 10° C. These values are indicative of the ease with which the structure of the gel is disrupted with lower values indicating that the material is easily disrupted.

The rheological properties of the starch or starch blend of which are useful in the invention in aqueous dispersions are characterized by a $G'_{eq}$ of 400 dyne/cm$^2$ or greater and a critical strain value (γcr) of 12 or greater when measured at 10° C., provided that the starch or blend is prepared having an anhydrous starch solids content of 10 wt %. Preferably the starches are characterized by a $G'_{eq}$ of about 600 to about 15,000 dyne/cm$^2$ and a (γcr) of about 15 to about 500.

Starches that have suitable rheological properties for use in the inventive spreads may be derived from any amylose-containing starch source including cereals, tubers, roots, legumes, and fruit starches and hybrid starches. Suitable native sources include corn, tapioca, pea, potato, sweet potato, sorghum, wheat, rice, sago, sorghum, and starches containing greater than 40% amylose (also referred to as high amylose starches), and the like.

Conversion products derived from any of the starches, including fluidity or thin- boiling starches prepared by oxidation, enzyme conversion, acid hydrolysis, heat and or acid dextrinization, thermal and or sheared products are also useful herein.

The rheologically suitable starch(es) may be chemically or physically modified. Suitable derivatives include esters, such as the acetate, and half esters, such as the succinate and octenyl succinate, prepared by reaction with acetic anhydride, succinic anhydride, and octenyl succinic anhydride, respectively; phosphate derivatives prepared by reaction with sodium or potassium orthophosphate or sodium or potassium tripolyphosphate; ethers such as hydroyxpropyl ether, prepared by reaction with propylene oxide; or any other edible starch derivatives or combinations thereof approved for use in food products.

Modification by crosslinking can also provide starches having rheological properties that are useful. Crosslinking agents suitable for food starches include phosphorus oxychloride, epichlorohydrin, sodium trimetaphosphate and adipic-acetic mixed acid anyhrides.

Procedures for modifying starches are described in "Starch and Its Modification" by M. W. Rutenberg, pages 22–26 to 22–47, Handbook of Water Soluble Gums and Resins, R. L. Davidson, Editor (McGrawhill, Inc., New York, N.Y. 1980).

Physically modified starches, such as thermally-inhibited starches described in WO 95/04082 (published Feb. 9, 1995), are also suitable for use herein.

Granular starches which have not been pregelatinized are preferred. Granular pregelatinized and non-granular pregelatinized starches are also useful herein. Conventional procedures for pregelatinizing starch are well known to those skilled in the art and described in such articles as Chapter XXII- "Production and Use of Pregelatinized Starch", Starch: Chemistry and Technology, Vol. III- Industrial Aspects, R. L. Whistler and E. F. Paschall, Editors, Academic Press, New York 1967. Jet-cooking and spray-drying are also conventional and described in U.S. Pat. No. 3,674,555 (issued Jul. 4, 1972 to G. R. Meyer et al.). Exemplary processes for preparing pregelatinized starches are disclosed in U.S. Pat. No. 4,280,851 (issued Jul. 28, 1981 to E. Pitchon et al.), U.S. Pat. No. 4,465,702 (issued Aug. 14, 1984 to J. E. Eastman et al.), U.S. Pat. No. 5,037,929 (issued Aug. 6, 1991 to S. Rajagopalan), U.S. Pat. No. 5,131,953 (Issued Jul. 21, 1992 to J. J. Kasica et al.), and U.S. Pat. No. 5,149,799 (issued Sep. 22, 1992 to R. W. Rubens).

Any starch or starch blends having suitable rheological properties for use in the spreads herein may be purified by any method known in the art to remove starch off flavors and colors that are native to the starch or created during starch modification processes. Purification processes preferred for treating the starches used in the spreads of this invention are disclosed in U.S. Ser. No. 07/832,838 filed Feb. 7, 1992, by J. J. Kasica, et al.. Alkali washing techniques, for starches intended for use in either granular or pregelatinized form, are also useful and described in the family of patents represented by U.S. Pat. No. 5,187,272 (issued Feb. 16, 1993 to C. W. Bertalan et al.).

Fat Components

Throughout this specification the terms oil and fat are used interchangeably. They are meant to include triglycerides from either vegetable or animal sources. Such vegetable triglycerides include soybean oil, sunflower oil, palm oil, palm kernel oil, both high and low erucic rapeseed oil, coconut oil, olive oil, sesame oil, peanut oil, corn oil and mixtures thereof.

Triglylcerides from animal sources include fish oil, tallow, sardine oil, dairy fat and mixtures thereof.

The oils may be chemically, physically and/or genetically modified products such as hydrogenated, fractionated and/or inter-esterified triglyceride mixtures and mixtures of two or more thereof, as well as edible substances that are physically similar to triglycerides such as waxes, e.g. jojoba oil, and poly fatty acid esters mono-or disaccharides, that can be used as replacement for or in a mixture with triglycerides. Preferably, the fat contained in the present spreads consists essentially of triglycerides from a vegetable source, preferably physically or chemically modified or unmodified liquid oil and mixtures thereof.

The precise composition of the fat is not critical. For organoleptic reasons, it is preferred to employ a fat that has a solid starch fat content at 35° C. of less than 5 wt. % (calculated on the weight of the fat), more preferably less than 3 wt. %. The solid fat content at 20° C. is suitably between 5 and 30 wt. %, preferably between 5 and 20 wt. %. At 5° C., the solid fat content is suitably between 5 and 50 wt. %, preferably between 10 and 40 wt. %.

The solid fat content can conveniently be determined by measuring the NMR N-value as described in Fette, Seifen, Anstrichmittel, 80 (1978), 180–186, which indicates the amount of fat present in the solid state expressed in percentage of the weight of the fat.

A typical triglyceride mixture that can suitably be used as fat in the present spread depends on the form of the final product such as stick, hard tub or soft tub. For example, a preferred fat mixture for a soft tub product may be a mixture of 20–90 wt. % liquid oil, (e.g. soybean oil) with 80–5 wt. % of a hardstock which is a mixture of randomly interesterified and/or hydrogenated oil.

The compositions may also comprise dairy and non-dairy ingredients as a source of fat, flavoring and protein. The amount of the ingredient present in the composition is selected depending on the effect of the protein ingredient on mouthfeel and sourness.

The dairy ingredients can be derived from any dairy source such as whole milk, semi-skimmed milk, skimmed milk, cultured buttermilk, buttermilk powder, skimmed milk powder, yogurt, quark, fromage frais, cottage cheese, whey powder, butter, etc.

To effect the flavor of the spreads of the invention dairy ingredients may optionally be incorporated in the product by using at least 3 wt. % of a dairy ingredient in the dry form in the spread. The optimum level of dairy ingredients will be dependent on the type and fat level of the dairy product. Also combinations of dairy products may be used.

If whole milk, semi skimmed milk, skimmed milk or combination thereof are used, the total level thereof is preferably from 40 to 85 wt. % of the composition, more preferred 50–80 wt. %, most preferred 55–80 wt. %.

If yogurt, quark, cottage cheese or fromage frais or a combination thereto is used, the total level is preferably from 2–40 wt. %, more preferred 5–30 wt. %. Under some circumstances it may be advantageous to use a mixture of these ingredients, for example in weight ratios between 20:1 and 2:1, the total level of yogurt/quark/cottage cheese/fromage frais and milk being from 60–85 wt. %.

The spread according to the present invention preferably comprises from about 10 to about 65 wt. % fat, more preferably 12 wt % to about 50 wt. %, optimally about 15 wt. % to about 45wt %.

The aqueous phase and/or the fat phase can suitably include emulsifiers. The amount and kind of emulsifier included are not critical. It is preferred to incorporate emulsifiers of the type and quantity as are commonly used in spreads. For example, mixtures of mono- and diglycerides derived from natural, partially hydrogenated or fully hardened vegetable oil can suitably be employed, using an amount of about 0.1 to about 3.0 wt. %, calculated on the total weight of aqueous phase and fat phase. Alternatively, other oil-compatible emulsifiers can be used. Mixtures of such emulsifiers with mono- and/or diglycerides and lecithin can also be suitable as emulsifier.

Typically, the average water droplet size of the dispersed aqueous phase is between about 1 and 60 um, but it may be larger or smaller than that. Preferably the droplet size ranges from about 1 to about 30.

The average water droplet size, as referred to herein, is the volume weighted mean of the droplet size distribution. It can be determined with NMR following the procedure as described in J. Colloid and Interface Science 140, (1990), pp. 105–113, & U.S. Pat. No. 5,302,408 herein incorporated by reference.

With such a water droplet size, on the one hand satisfactory flavor release in the mouth can be obtained, while on the other hand the product will have an adequate microbiological stability.

The average droplet size of the present spreads can be varied easily, by adjusting the conditions during the preparation. If, for example, the spread is prepared using Votator$^{(R)}$ equipment, then the average droplet size can be decreased, for example by increasing the shear forces exerted in the A-units, e.g. by increasing the rotor speed or the number of blades, or by decreasing the annulus.

In addition to the above mentioned ingredients, spreads of the invention may comprise a number of optional ingredients such as flavoring, flavoring sugars (e.g., lactose) salt, preservatives, acidifiers, vitamins, coloring materials, etc.

Preferably the level of flavoring materials (other than those which are incorporated through the dairy ingredients) is less than 0.5 wt. %, for example 0.01 to 0.2 wt. %. Preferably the level of salt (sodium chloride) is from 0–4 wt. %, more preferred 0.1 to 3 wt. %, most preferred 0.3 to 1.7 wt %.

Preservatives are preferably incorporated at a level of 0–4 wt. %, more preferred 0.01 to 1 wt. %, most preferred 0.05 to 0.3 wt %. Especially preferred is the use of potassium sorbate. A preferred coloring material is beta carotene; preferred levels of coloring material are from 0–1 wt. %, more preferred 0.01 to 0.2 wt. %. Acidifiers may be incorporated to bring the pH of the product to the desired level, preferably the pH of the product is from 3 to 10, more preferably 3.5 to 7. A suitable acidifier is for example lactic acid or citric acid.

Another optional ingredient which may be present in compositions of the invention are proteins. Preferably the protein level in spreads of the invention is 0–15 wt. %, more preferred, up to 6 wt. %, most preferred up to 4%. In an especially preferred embodiment of the invention the protein are partially or wholly obtained from dairy sources. In another preferred embodiment of the invention the protein is wholly or partially a vegetable protein, especially soy bean protein. For example if mixtures of these ingredients are used suitable with ratios of dairy protein to vegetable protein may for example be from 10:1 to 1:10.

The spread may optimally comprise a thickening agent or combination of thickening agents. The presence of a thickening agent can improve the oral response of the dispersion. A particularly preferred thickening agent is xanthan gum. Under mastication and during break-down of the dispersion, the structure produced by such thickening agent breaks down to some extent but prevents the product from getting very thin rapidly and causes some residual viscosity to be maintained, leading to a desirable consumer property. Other gelling agents which may be included are gelatin, carrageenan, agar, alginate, gellan, pectin, furcelleran and gelling starch mixture of amylose and amylopectin, a gelling maltodextrin and a rapid gelling starch such as those described in U.S. Pat. No. 5,338,560, herein incorporated by reference. The thickening and gelling agents may be present in an amount of up to 10 wt. %, preferably 0.01 to 5 wt. % most preferably 0.01 to 3 wt. %.

To obtain optimal organoleptic characteristics, it is preferred for the spread to have a continuous phase that melts at a temperature between about 20° C., and about 45° C., more preferably between about 30° C. and about 37° C. This facilitates breakdown in the mouth and prevents the dispersion from being perceived as waxy.

The dispersion may comprise other ingredients as is considered desirable in view of the envisaged use by the consumer of the end product. For example, the dispersion may comprise coloring matter, e.g. beta-carotene, taste and flavor compounds, e.g., sodium chloride, or non-gelling milk protein, preservative, e.g., potassium sorbate, and thickening agents, e.g., non-gelling starch and/or protein and gums, e.g., xanthan gum.

The spread may further comprise material that forms an (additional) dispersed phase in the spread. For example, the spread may contain a small particles of herbs and vegetable. The spread can then, for example, be used as vegetable spread. Similarly, finely ground nuts or small cheese particles may be included to obtain a nut or cheese spread, respectively. Including such nut or cheese particles in the dispersion implies that some fat is incorporated in the spread.

Testing Methods Starch Rheology Test

Rheology tests on the starch dispersions were carried out on a Rheometrics Fluids Spectrometer II and a Rheometrics Dynamic Stress Rheometer (obtained from Rheometrics Scientific, Piscataway, N.J.). Measurements were made using parallel plate geometry in all cases.

Starch dispersions were prepared from powdered starch samples and distilled water at an anhydrous starch solids of 10%. The specific dissolution procedure depended on the starch being solubilized. For granular and cold water soluble starches, the dispersion was stirred with a magnetic stirrer at 700 rpm and 25° C. for 30 minutes and then heated to 90° C. under mild agitation over a five minute period, after which it was maintained at 95° C. for an additional 30 minutes while being stirred at 400 rpm. For hot water soluble starches (e.g. converted high amylose), the dissolution procedure involved mixing the starch for 2 minutes in a blender with 95° C. water, before transferring the dispersion to a hot plate at 95° C. with a magnetic stirrer set at 400 rpm for 30 minutes. After the starch was thoroughly dispersed, the hot solution was loaded onto the rheometer plates which were pre-cooled to 10° C. and rheological testing was begun immediately.

The first rheological test done on the starch dispersions was designed to measure the degree of structure formation within the sample at 10° C. An oscillatory shear time sweep was begun immediately after the hot sample was loaded on the cold rheometer (10° C.) and continued until the G' values, which were measured every 60 seconds achieved an equilibrium value, $G'_{eq}$. Equilibrium was defined as G' changing by less than 10% over 600 seconds. The time sweep was run at a frequency ($\omega$) of 0.5 rad/s with a strain ($\gamma$) in the linear viscoelastic window of the sample. The linear viscoelastic strain, G is defined as a strain which is small enough that it does not disrupt the structure of the material being measured. The resulting profile of G'dyne/cm$^2$ for the measured starch dispersions as a function of time (seconds) is illustrated in FIG. 1.

Figure 2:
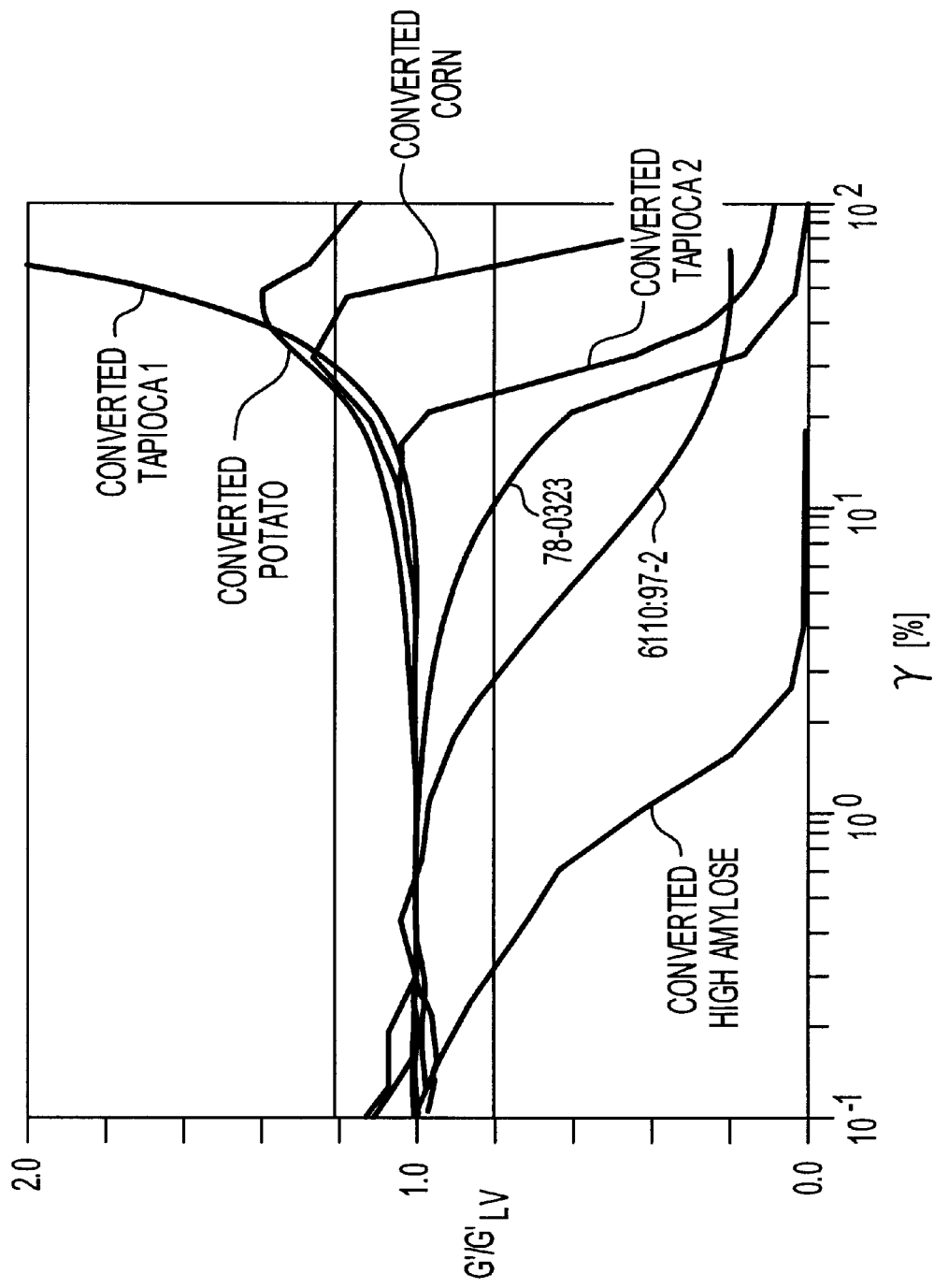
FIG. 2 illustrates the critical strain values of gelling starches used in the invention compared to the values of those starches outside the invention's scope. The $G'/G'_{LV}$ values are plotted to determine the critical strain values (γcr)

The second rheological test done on each starch dispersion was designed to measure the size of deformation required to disrupt the structure of the material after it had been allowed to achieve an equilibrium at 10° C. Once again, the hot sample was loaded onto the rheometer plates which were pre-cooled to 10° C. After a 7500 second waiting period at 10° C., an oscillatory shear strain sweep was performed at a frequency ($\omega$) of 1 rad/s. The strain sweep extended from a strain of $\gamma=0.1$ to $\gamma=100$. The critical strain ($\gamma$cr) of each starch dispersion was taken from this experiment as the minimum $\gamma$ at which $G'/G'_{LV}$ becomes less than 0.8 or greater than 1.2. The value $G'_{LV}$ is defined as the limiting value of G' as the $\gamma$ approaches zero. Values of $\gamma$cr are indicative of the ease with which the structure of the starch gel is disrupted, with lower values indicating the material is easily disrupted. The profile of $G'/G'_{LV}$ as a function of for the measured starch dispersions is illustrated in FIG. 2.

Process

The present spread can be prepared in various ways known in the art. To obtain a product with optimal structure, it can, however, be advantageous to heat the composition (which is also advantageous because it facilitates dissolution of ingredients and obtaining an essentially homogenized mixture and which can further also be desirable to pasteurize the composition) and then cool it while subjecting it to working conditions. This can e.g., be done by passing it through two cooling units with a mixer in between.

Alternatively, one or more stirred or surface scraped cooling units can be used. A combination of such units can suitably be employed as well. Such a process can, for example, suitably be carried out in Votator$^{(R)}$ line with one or more surface scraped heat exchangers, optionally combined with one or more pin stirrers, so-called crystallizers, and at high speed are referred to as crystallizers which aid in inversion from an oil-in-water emulsion to a water-in-oil emulsion.

For the process according to the invention, a crystallizing inverter unit (i.e. C* unit) is positioned between two scrapped surface heat exchanger units (A-units) having selected temperature ranges and the shear rates or shaft rotation speeds as known in the art.

In a preferred embodient, the aqueous and fat phases are added to a first heat exchanger unit (A-unit) and the crystallization process begins to form a cooled emulsion.

The cooled emulsion which also contains the gelling amylose containing starch passes from the A-unit into the C* unit. In the C prime unit the cooled water continuous emulsion is inverted into a fat continuous emulsion by increasing the shaft rotation speed.

The crystallized fat continuous emulsion passes from the C* unit into a second surface heat exchanger unit (A-unit) to be cooled again to form a product having a fat continuous phase and a selected mean droplet size of the dispersed aqueous phase. Additional crystallizers (C unit or B unit) may be necessary to provide a residence time for in-line crystalization and thus provide a proper consistency for the spread to be packed in a tub or in a stick form.

EXAMPLE 1

The superiority in spreadability, stability and mouthfeel of the spreads of the present invention, based on amylose containing starches exhibiting specific rheological properties, was demonstrated as follows:

Spread formulations were prepared as described in Table I.

TABLE 1

| Ingredients | % wt. in Product |
|---|---|
| Starch | 5.0* |
| Lecithin | 1.2 |
| Lactic Acid (pH 5.0) | 0.1 |
| Nonfat Dry Milk | 0.9 |
| Salt | 1.0 |
| Potassium Sorbate | 0.13 |
| Saturated Monoglycerides | 0.25 |
| Triglyceride Mixture of Hardstock/liquid, $N_{10-18}$ | 39.5 |
| Balance Water to | 100.0. |

*The level of the following starches were in the 5% by weight range: 7990–119; R6110–129–3; R8624–95; Purity LFS, R6110:129–5. The levels of the following starches were used as follows:

R6110:129–2 (5–9%) and R6110:129–7 (2.5–3.5%) while N LITED, I.N. Oil II and 6110:97–2 were tested up to a level of 10 wt. %.

The starch was dispersed in cold water and heated while stirring in a tank to 90° C. to completely disperse and gelatinize the starch. Skim milk, buttermilk powder, potassium sorbate and beta-carotene were added to dissolve. The solution was then cooled to 60° C.

Lactic acid was added to obtain a pH of 5.0 and the oil was added to the mixture still maintained at 60° C. The composition was then passed through a scrapped surface heat exchanger to pasteurize. The composition was pasteurized at 85° C. for 15 seconds. The pasteurized composition was then passed through a scraped surface heat exchanger and cooled to 5–15° C. The composition was inverted to a fat continuous emulsion using a high speed crystallizer. The composition was filled into tubs and stored at 5° C.

Ten starches were selected having rheological properties both within and outside the scope of the invention were selected to provide the spreads as described in Table 2 below.

The spread compositions were evaluated by a panel of 8 experts, who rated the spreads for spreadability, stability and organoleptic properties. Spreadability was rated on a scale of 0 (not spreadable) to 5 (very spreadable). The results of the evaluation are also presented in Table 2 below:

Spreads based on starches within the scope of the invention (i.e. 7990–119; R6110:129–3; R8624–95; and Purity LFS) were observed to have good spreadability and were stable with no moisture or watering out. Moreover, the spreads were rated as having good organoleptic properties. All of the starches within the invention exhibited rheological values of $G'_{eq}$ 400 or greater and critical strain values of 12 or greater.

The gelling starches described in the prior art (i.e. 6110:97–2 and I.N. Oil II described in U.S. Pat. No. 5,338,560 and R6110:129–5 described in U.S. Pat. No. 5,472,729) were observed to provide spreads having poor spreadability which exhibited instability or watering out, or could not form a gel. These starches all had unacceptably low $G'_{eq}$ values.

Although spreads prepared with 78–0323 starch (described in U.S. Pat. No. 4,865,867) exhibited acceptable spreadability, the spread was instable and watered out. These spreads based on 78–0323 starches which exhibited acceptable $G'_{eq}$ values, however, the critical strain values for these starches fell outside the acceptable range. R6110:129–7 starch is not an amylose containing starch and did not provide a spread which gelled.

Finally, a high amylose starch (i.e. R6110:129–2) exhibited an acceptable $G'_{eq}$ value but did not fall within the acceptable critical strain values of the invention. As a result it was observed that spreads based on this starch were neither spreadable nor stable. Thus, selected amylose based gelling starches which exhibited specific rheological properties were observed to provide good spreads having consumer acceptable characteristics. Gelling and non-gelling starches of the prior art which did not exhibit the rheological properties of the starches of the invention were observed to provide spreads which lacked either spreadability or stability.

We claim:

1. A continuous fat spread comprising;
   (a) from about 10 to about 65 wt. % of a continuous fat phase; and
   (b) from about 90 to about 35 wt. % of a dispersed aqueous phase, the aqueous phase comprising from about 1 to about 20 wt. % of a gelling amylose containing starch having rheological properties charac-

TABLE 2

| Trade Reference* | Sample | γLV | $G'_{eq}$ (dyne/cm$^2$) | $G'_{LV}$ (dyne/cm$^2$) | γcr | Spreadability score | Comments |
|---|---|---|---|---|---|---|---|
| R6110:129-2 | Converted High Amylose | 0.093 | 2.36E+05 | 2.80E+05 | <.50 | 0 | Watering Out |
| R6110:129-7 | Crosslinked Stabilized Waxy Corn | 0.110 | 1.15E+04 | N/A | N/A | 2 | No Gelled Formed |
| N-lite D | 78-0323 | 0.096 | 2.63E+04 | 2.67E+04 | 10.50 | 3.5 | Watering Out |
| 7990-119 | Converted Potato | 1.000 | 1.23E+04 | 1.14E+04 | 23.25 | 45 | Stable |
| R6110:129-3 | Converted Corn | 1.000 | 4.94E+03 | 4.90E+03 | 25.50 | 4.5 | Stable |
| R8624-95 | Converted Tapioca #1 | 1.000 | 7.11E+02 | 7.33E+02 | 27.75 | 4.5 | Stable |
| Purity LFS | Converted Tapioca #2 | 1.000 | 5.08E+03 | 6.47E+03 | 23.50 | 4.5 | Stable |
| 6110:97-2 | 6110:97-2 | 1.000 | 1.80e+01 | 7.40E+01 | 2.5 | 2 | Watering Out |
| I.N. Oil II | I.N. Oil II | 50.00 | <.1 | N/A | N/A | 2 | Watering Out |
| R6110:129-5 | Converted Waxy Corn | 40.00 | <.5 | N/A | N/A | 2 | No Gel Formed |

*Starch samples supplied by National Starch and Chemical Co. of Bridgewater, NJ.

terized by a $G'_{eq}$ of 400 dyne/cm$^2$ or greater and a critical strain (γcr) of 12 or greater at 10° C., provided the starch is prepared at a concentration having an anhydrous starch solid content of 10 wt %.

2. A spread according to claim 1 wherein the gelling amylose containing starch has a $G'_{eq}$ of from about 600 to about 15,000 dyne/cm$^2$.

3. A spread according to claim 1 wherein the amylose containing starch has a critical strain value of about 15 to about 500.

4. A spread according to claim 1 further comprising a dairy ingredient selected from the group of whole milk, semi-skimmed milk, skimmed milk, cultured buttermilk, buttermilk, buttermilk powder, skimmed milk powder, yogurt, quark, fromage frais, cottage cheese, whey powder, butter and mixtures thereof.

5. A spread according to claim 1 further comprising up to about 10 wt. % of a gelling agent selected from the group consisting of carrageenan, agar, alginate, gellan, pectin, furcelleran, gelatin, a gelling maltodextrin, a rapid gelling starch and mixtures thereof.

6. A spread according to claim 1 comprising up to about 45 wt. % a fat.

7. A spread according to claim 1 further comprising a thickening agent.

8. A continuous fat spread comprising:
   (a) from about 10 to about 65 wt. % of a continuous fat phase; and
   (b) from about 90 to about 35 wt. % of a dispersed aqueous phase, the aqueous phase comprising from about 1 to about 20 wt. % of a modified gelling amylose containing starch having rheological properties characterized by a $G'_{eq}$ of 400 dyne/cm$^2$ or greater and a critical strain (γcr) of 12 or greater at 10° C., provided the starch is prepared at a concentration having an anhydrous starch solid content of 10 wt. %, and further provided that said spread contains no natural starch.

* * * * *